Sept. 13, 1960

H. M. PRYALE 2,952,374

SEALING APPARATUS

Filed July 14, 1958

*INVENTOR.*
HARRY M. PRYALE
BY
*Whittemore, Hulbert & Belknap*

ATTORNEYS

2,952,374

SEALING APPARATUS

Harry M. Pryale, Bloomfield Township, Oakland County, Mich., assignor to Baldwin Rubber Company, Pontiac, Mich., a corporation of Michigan Filed July 14, 1958, Ser. No. 748,480

9 Claims. (Cl. 215—40)

This invention pertains to a sealing apparatus, and more particularly, to an apparatus which has multiple sealing surfaces wherein one of said surfaces is angularly inclined to the direction of sealing movement as between a screw cover and container.

This invention provides a seal between two member, such as a screw cover and container, which are threadedly engaged and axially movable toward one another. The sealing means comprises a ring formed of a resilient material which is supported by the cover and engageable with the top and side periphery of the container. The side periphery of the ring and the container preferably forms an angle of less than 45 degrees with the container axis so that the mechanical advantage between the force used to thread the cover on the container and the force exerted between the side peripheries of the ring and the container is increased. This invention provides a multiple seal between the screw cover and container and also provides inclined sealing surfaces between the cover and container which are urged together with an increased mechanical advantage.

It is therefore an object of this invention to provide a sealing construction wherein a sealing ring supported by one of the members has a multiplicity of surfaces which are engageable with corresponding surfaces on the other of the members to provide a multiple seal and one which requires less sealing force to effect predetermined sealing pressures.

Another object of this invention is to provide a seal ring between a screw cover and container which is supported by the cover and engages the container on a top and side periphery with the side periphery being inclined to the container axis and with the angle of inclination being less than 45 degrees for increasing the mechanical advantage in sealing the side peripheries.

It is a further object of this invention to increase the sealing action between a screw cover and container for a given fastening force applied to the cover.

Another object of this invention is to increase the sealing action between a screw cover and container by providing multiple, angularly inclined sealing surfaces.

Other objects and features of the invention will become apparent as the description proceeds, especially when taken in conjunction with the accompanying drawing, illustrating a preferred embodiment of the invention, wherein.

Figure 1:
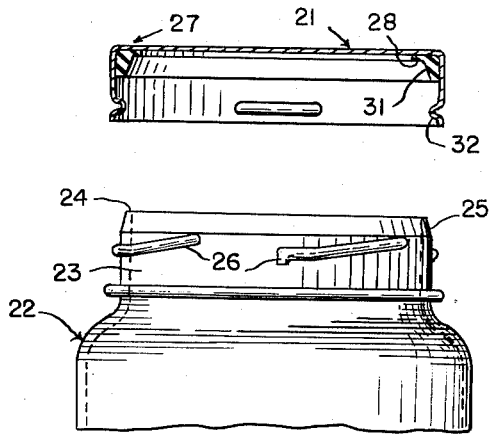
Figure 1 is a partial elevational view partly in section of a screw cover removed from a container.
Figure 3:
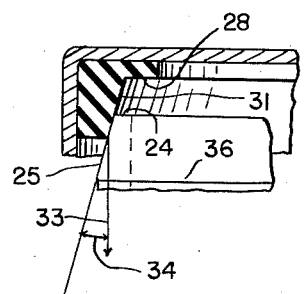
Figure 3 is a partial, slightly enlarged view of a cover placed on a container before compression of the sealing ring.

In Figure 1 the cover 21 is shown in a removed position from the container 22 which has a cover receiving head 23, a top periphery 24 and a bevel 25. Extending laterally from the container head 23 are a plurality of thread cams 26. Cover 21 is shown in section and supports about its upper periphery a resilient sealing ring 27 which may consist of rubber, plastic, or any suitable molded material. Ring 27 has two sealing surfaces which are engageable with corresponding surfaces on the container head; the first surface 28 engages the top periphery 24 of the head 23, and the second surface 31 is inclined to the container axis and engages bevel surface 25 of the head 23. Also formed in cover 21 are indents 32 which fit between thread cams 26 and engage the lower surfaces thereof to move the cover axially towards the container as it is turned in a closing movement with a mechanical advantage depending on the slope of the cams 26.

Figure 2:
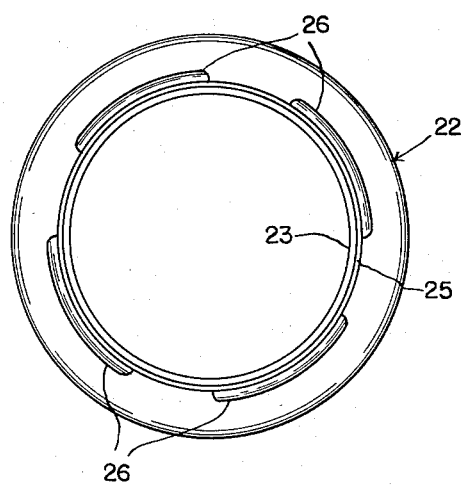
Figure 2 is a plan view of the container.
Figure 4:
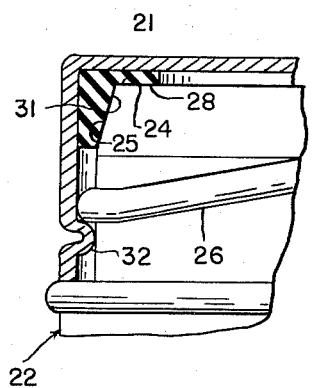
Figure 4 is a view similar to Figure 3 after the cover has been fully fastened to the container and the sealing ring has been compressed against the container.

Line 33, shown in Figure 2, is parallel to the axial movement of the cover relative to the container and forms an angle 34 with inclined surface 31 of the sealing ring and this angle is preferably less than 45 degrees. In this particular embodiment the angle is about 20 degrees, so that the sealing force between surfaces 24 and 31 is increased by the mechanical advantage available from the wedging action between the surfaces. The ratio of the advantage is proportional to the slope of bevel 25. In addition, a sealing force is exerted between surface 28 of ring 27 and the surface 29 of the container head 23 so that a double seal is provided between the cover and the container and the force between the surfaces 24 and 31 is increased due to the mechanical advantage of the wedging action.

It is within the scope of this invention to apply a sealing ring, such as ring 27, between two parts of any threaded connection with the male portion of the connection having a beveled periphery corresponding to the annular surface 31 of the ring 27.

The drawing and the foregoing specification constitute a description of the improved sealing apparatus in such full, clear, concise and exact terms as to enable any person skilled in the art to practice the invention, the scope of which is indicated by the appended claims.

What I claim as my invention is:

1. Sealing apparatus between a threaded cover and container comprising resilient means supportable about the periphery of the cover and having portions extending axially and transversely thereof, the axially extending portion being of greater thickness than the transversely extending portion, said sealing apparatus also having a surface transverse to axial cover travel and a surface inclined less than 45 degrees to closing axial cover travel, said container having peripheral transverse and inclined surfaces corresponding to and engageable with said resilient means surfaces, said cover being threadedly engaged with said container thereby providing progressive axial movement therebetween to urge the inclined surfaces of said container against the inclined surfaces of said resilient means with an increased mechanical advantage.

2. Sealing apparatus between a cover and container comprising annular resilient means supportable by the cover and having a multiplicity of surfaces inclined to the axial travel of said cover relative to the container, said container having a multiplicity of inclined surfaces corresponding to and engageable with surfaces of said resilient means, said cover being threadedly engaged with said container thereby providing progressive axial movement therebetween to urge the inclined surfaces of said resilient means towards the surfaces of said container to form a multiple seal.

3. Sealing apparatus between a cover and container comprising annular resilient means supportable by the cover and having a multiplicity of surfaces inclined to the axial travel of said cover relative to the container, said container having a multiplicity of inclined surfaces corresponding to and engageable with surfaces of said resilient means, said cover being threadedly engaged with said container whereby progressive axial movement therebetween is provided to urge the inclined surfaces of said resilient means towards the surfaces of said container to form a multiple seal, one of said inclinations being less than 45 degrees to the closing axial movement between said cover and container so that a greater mechanical advantage is available between closing force and sealing force between said inclined surfaces.

4. Sealing apparatus comprising first and second members movable axially toward and away from one another, annular resilient means supportable by one of said members and having portions extending axially and transversely thereof, the axially extending portion being of greater thickness than the transversely extending portion, said sealing apparatus also having a multiplicity of surfaces inclined to the axial movement of said members with one of said surfaces forming an angle of less than 45 degrees with the direction of closing movement, said one member having a resilient means support and the other member having inclined surfaces corresponding to and engageable with the surfaces of said resilient means, said members being threadedly engaged so that they are progressively movable toward one another thereby urging the inclined surfaces of said resilient means towards the inclined surfaces of said other member providing a multiple mechanical advantage.

5. Sealing apparatus comprising first and second members movable axially toward and away from one another, annular resilient means supportable by one of said members and having portions extending axially and transversely thereof, the axially extending portion being of greater thickness than the transversely extending portion, said sealing apparatus also having a multiplicity of surfaces inclined to the relative axial movement of said members, said one member having a resilient means support and the other member having inclined surfaces corresponding to and engageable with the surfaces of said resilient means, said members being threadedly engaged so that they are progressively movable toward one another urging the inclined surfaces of said resilient means towards the inclined surfaces of said other member to form a multiple seal.

6. A sealing member adapted for use between a screw cover and container comprising a resilient sealing member supportable about the periphery of the cover, said sealing member being annular and having an L-shaped cross-section, one leg of said L-shaped cross-section having parallel sides extending radially inwardly from the other leg thereof, said other leg extending axially with respect to said one leg, the radially inner surface of said other leg converging toward the radially outer surface of said other leg and forming an obtuse angle with said one leg.

7. A sealing member adapted for use between a screw cover and container comprising a resilient sealing member supportable about the periphery of the cover, said sealing member being annular and having an L-shaped cross-section, one leg of said L-shaped cross-section having parallel sides extending radially inwardly from the other leg thereof, said other leg extending axially with respect to said one leg, the radially inner surface of said other leg converging toward the radially outer surface of said other leg and forming an obtuse angle of less than 135 degrees with said one leg.

8. A sealing member adapted for use between a screw cover and container comprising a resilient sealing member supportable about the periphery of the cover, said sealing member being annular and having an L-shaped cross-section, one leg of said L-shaped cross-section having parallel sides extending radially inwardly from the other leg thereof, said other leg extending axially with respect to said one leg, the radially inner surface of said other leg converging toward the radially outer surface of said other leg and forming an obtuse angle of less than 135 degrees with said one leg, said other leg being substantially thicker than said one leg.

9. Sealing apparatus comprising a screw cover and container movable axially toward and away from one another, a resilient sealing member, said sealing member being annular and having an L-shaped cross-section, one leg of said L-shaped cross-section having parallel sides extending radially inwardly from the other leg thereof, said other leg extending axially with respect to said one leg, the radially inner surface of said other leg being inclined toward the radially outer surface of said other leg and forming an obtuse angle of less than 135 degrees with said one leg, said other leg being substantially thicker than said one leg, said resilient member being supported about the inner periphery of said cover with said other leg extending toward said container, said container having peripheral inclined and transverse surfaces corresponding to and engageable with said radially inner surface on said resilient member and the intersecting transverse surface thereof, said cover being threadedly engageable with said container whereby progressive axial movement is provided therebetween to urge the inclined surface of said container against the inclined surface of said resilient means with an increased mechanical advantage.

References Cited in the file of this patent

UNITED STATES PATENTS

| | | |
|---|---|---|
| 1,823,786 | Crabbe | Sept. 15, 1931 |
| 2,700,186 | Stover | Jan. 25, 1955 |

FOREIGN PATENTS

| | | |
|---|---|---|
| 1,063,448 | France | Dec. 16, 1953 |